US011269903B1

(12) United States Patent
Vijayaraj et al.

(10) Patent No.: US 11,269,903 B1
(45) Date of Patent: Mar. 8, 2022

(54) INDEXING AND RETRIEVAL OF CONFIGURATION DATA

(71) Applicant: Amazon Technologies, Inc., Seattle, WA (US)

(72) Inventors: Veeraraghavan Vijayaraj, Redmond, WA (US); Akram Malkawe, Bothell, WA (US); Pinwen Su, Seattle, WA (US); John Russell Lane, Spring Lake, MI (US)

(73) Assignee: Amazon Technologies, Inc., Seattle, WA (US)

( * ) Notice: Subject to any disclaimer, the term of this patent is extended or adjusted under 35 U.S.C. 154(b) by 65 days.

(21) Appl. No.: 16/586,749

(22) Filed: Sep. 27, 2019

(51) Int. Cl.
*G06F 7/00* (2006.01)
*G06F 16/2458* (2019.01)
*G06F 16/22* (2019.01)

(52) U.S. Cl.
CPC ...... *G06F 16/2477* (2019.01); *G06F 16/2264* (2019.01)

(58) Field of Classification Search
CPC ...... G06F 16/2264; G06F 16/22; G06F 16/31; G06F 16/41; G06F 16/51; G06F 16/2477
See application file for complete search history.

(56) References Cited

U.S. PATENT DOCUMENTS

| | | | |
|---|---|---|---|
| 6,484,160 B1 * | 11/2002 | Richard | G06F 16/289 |
| 7,328,325 B1 * | 2/2008 | Solis | G06F 3/0605 |
| | | | 711/202 |
| 7,409,398 B1 * | 8/2008 | Flam | G06Q 10/10 |
| 7,698,545 B1 * | 4/2010 | Campbell | G06F 11/301 |
| | | | 713/1 |
| 9,483,282 B1 * | 11/2016 | Vandervennet | G06F 9/4411 |
| 10,044,522 B1 * | 8/2018 | Shamis | H04L 12/44 |
| 10,120,936 B2 * | 11/2018 | Kumar | H04L 67/02 |
| 10,122,872 B1 * | 11/2018 | Shin | H04L 41/0859 |
| 2004/0088142 A1 * | 5/2004 | Ashley | H04L 41/0253 |
| | | | 702/184 |
| 2004/0131020 A1 * | 7/2004 | Smith | H04N 21/25858 |
| | | | 370/312 |
| 2004/0215646 A1 * | 10/2004 | Kaier | G06F 8/71 |
| 2006/0104220 A1 * | 5/2006 | Yamazaki | H04L 67/125 |
| | | | 370/254 |
| 2009/0254639 A1 * | 10/2009 | Manchester | H04W 28/18 |
| | | | 709/220 |
| 2011/0314138 A1 * | 12/2011 | Kobayashi | G06F 11/0709 |
| | | | 709/222 |
| 2012/0102543 A1 * | 4/2012 | Kohli | H04L 63/20 |
| | | | 726/1 |

(Continued)

*Primary Examiner* — Mohammed R Uddin
(74) *Attorney, Agent, or Firm* — Davis Wright Tremaine LLP

(57) ABSTRACT

A system for storing and retrieving configuration data causes time-based and content-based indexes to be stored on a storage service. The system receives a request to identify the value of a property during a time period indicated by the request. The system retrieves, from the storage service, a time-based index associated with the time period. The retrieved time-based index is searched to identify a content index associated with the time period. The system retrieves the content index from the storage service, and searches the content index to identify a value, of the property, that is associated with the time period. The system generates a response to the request based on the results of the search of the content index.

20 Claims, 9 Drawing Sheets

(56) References Cited

U.S. PATENT DOCUMENTS

| | | | | |
|---|---|---|---|---|
| 2013/0006925 A1* | 1/2013 | Sawai | ............... | G06F 16/29 |
| | | | | 707/609 |
| 2013/0091105 A1* | 4/2013 | Bhave | ............... | G06F 16/27 |
| | | | | 707/693 |
| 2014/0122427 A1* | 5/2014 | Dary | ............... | G06F 16/27 |
| | | | | 707/620 |
| 2014/0122430 A1* | 5/2014 | Dary | ............... | G06Q 10/0639 |
| | | | | 707/624 |
| 2014/0149466 A1* | 5/2014 | Sato | ............... | G06F 11/3419 |
| | | | | 707/803 |
| 2015/0193557 A1* | 7/2015 | Okuno | ............... | G06F 30/20 |
| | | | | 703/1 |
| 2015/0199238 A1* | 7/2015 | Badgley | ............... | G06F 16/2228 |
| | | | | 707/682 |
| 2015/0215165 A1* | 7/2015 | Ohsuga | ............... | H04L 41/0863 |
| | | | | 709/221 |
| 2015/0379034 A1* | 12/2015 | Apte | ............... | G06F 9/44505 |
| | | | | 707/722 |
| 2017/0315683 A1* | 11/2017 | Boucher | ............... | G06F 40/205 |
| 2018/0107188 A1* | 4/2018 | Nixon | ............... | G05B 19/052 |
| 2018/0123885 A1* | 5/2018 | Stenberg | ............... | H04L 41/0863 |
| 2020/0084115 A1* | 3/2020 | Biran | ............... | H04L 41/145 |
| 2020/0192875 A1* | 6/2020 | Rudolf | ............... | G06F 16/93 |
| 2020/0278988 A1* | 9/2020 | Prokoph | ............... | G06F 16/9024 |
| 2020/0409543 A1* | 12/2020 | Imamura | ............... | G06F 3/04847 |

\* cited by examiner

INDEXING AND RETRIEVAL OF CONFIGURATION DATA

BACKGROUND

As computing systems become increasingly complex, so too has the difficulty involved in managing their configuration. The configuration of a computing system may involve a variety of software and hardware settings. On a given computing system, these settings may change over time. Diagnosing problems caused by these changes to the configuration of a computing system may be difficult to diagnose. This difficulty may be due in part to the difficulty in determining what has changed, and when a relevant change was made. The difficulty may also be due, in part, to the voluminous amount of configuration data that may be generated by a given computing system.

BRIEF DESCRIPTION OF THE DRAWINGS

Various techniques will be described with reference to the drawings, in which.

DETAILED DESCRIPTION

Figure 1:
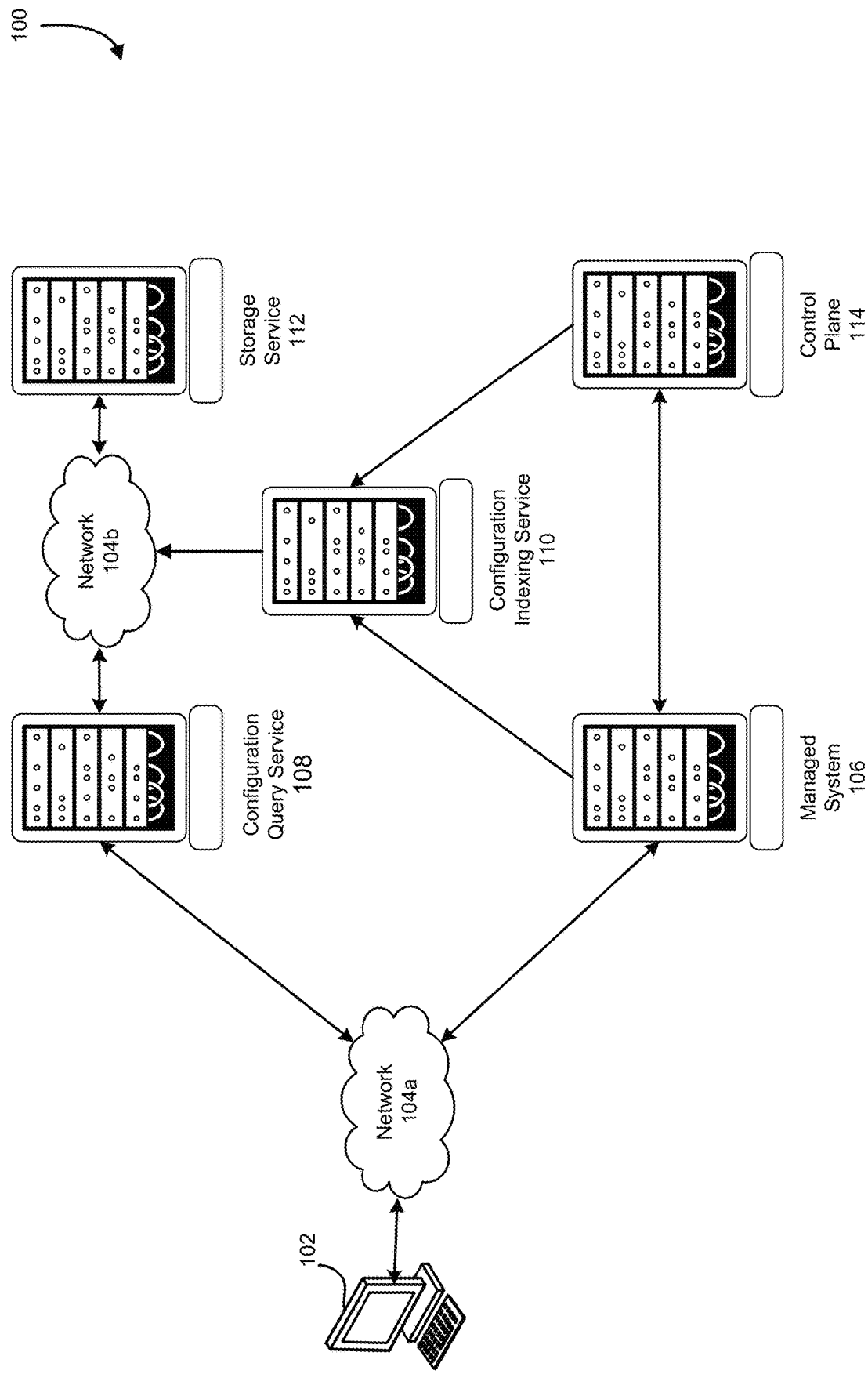
FIG. 1 illustrates a system that performs indexing and retrieval of configuration change data, in accordance with at least one embodiment.

The configuration of a computing system may change over time, due to various reasons such as the installation or modification of application programs, the execution of application programs, the addition or removal of hardware, and so on. Diagnosing problems caused by changes to configuration can be difficult. However, the diagnoses of such problems may be facilitated by the provision, in accordance with embodiments described herein, of information indicating when a configuration property was changed, and what it was changed to. However, the provision of such information may be difficult or inefficient when done with certain conventional techniques.

In an example, the configuration of a managed computing system is monitored. Changes to the configuration are recorded using a two-level indexing technique in which the first level is indexed by time, and the second level is indexed by content. The time-based indexes at the first level refer to content-based indexes on the second level. The content-based indexes provide information concerning the values of a various configuration properties, and may be searched to efficiently identify the value of a particular configuration property during an indicated time period.

In a further aspect of the example, a remote storage service is used to store files containing the time-based and content-based indexes. The storage service may scale independently of other services, such as those performing the searches of the indexes. This approach allows for reduced cost and greater efficiency compared to other, more conventional techniques, such as storing the indexed data permanently on a local database.

In a further aspect of the example, a query requests information pertaining to the value of a configuration property at a particular time. Similarly, a query might request a history of such values. To process the query, a time-based index relevant to the indicated time period is identified and downloaded from the storage service. The time-based index is searched to identify one or more content-based indexes. The content-based indexes are downloaded and searched, and the values of the configuration property, for the indicated time, are identified.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including those related to the storage and retrieval of configuration information. In particular, the technical field of computing configuration management is improved by the provision of techniques, embodiments of which are described herein, for indexing configuration data and facilitating the efficient retrieval of configuration data.

FIG. 1 illustrates a system that performs indexing and retrieval of configuration change data, in accordance with at least one embodiment. In the example 100 of FIG. 1, a client device 102 communicates via a network 104a with hosted computing resources, which may sometimes be referred to as hosted services, or as services. Examples may include, but are not necessarily limited to, the illustrated managed system 106 and configuration query service 108.

The network 104a may be any of a variety of network types, including but not necessarily limited to the public Internet or a private intranet. The network 104a may be implemented using one or more of a variety of networking technologies, including but not necessarily limited to those based on one or more of TCP/IP, Ethernet, wireless, or cellular protocols and technologies.

The managed system 106 may be any of a variety of computing resources, or combinations of computing resources. Examples include, but are not necessarily limited to, virtual machines, managed storage devices, stand-alone computing devices, managed networks, and so forth. In a further example, the managed system 106 includes a managed network and a combination of additional computing resources, such as hosted computing services, that operate using the managed network. The managed system 106 may be configured, maintained, and operated, in whole or in part, by a computing services provider. The managed system 106 may be utilized, for a wide variety of purposes, by a client associated with the client device 102.

Over time, the configuration of the managed system 106 may change. Configuration, as used herein, refers to the state of the managed system 106. Configuration data, therefore, may refer to information about the state of the managed system 106. Examples include, but are not necessarily limited to, information pertaining to the presence or operation of software applications which may be installed on, run on, or otherwise be associated with the managed system 106, and information pertaining to the presence or operation of hardware installed on, connected to, or otherwise associated with the managed system 106. Further examples include, but are not necessarily limited to, registry settings, data files, device status information, amounts of available local storage, and so forth. The rate of change of the various configuration settings may be high, particularly for managed systems that contain many components.

Figure 9:
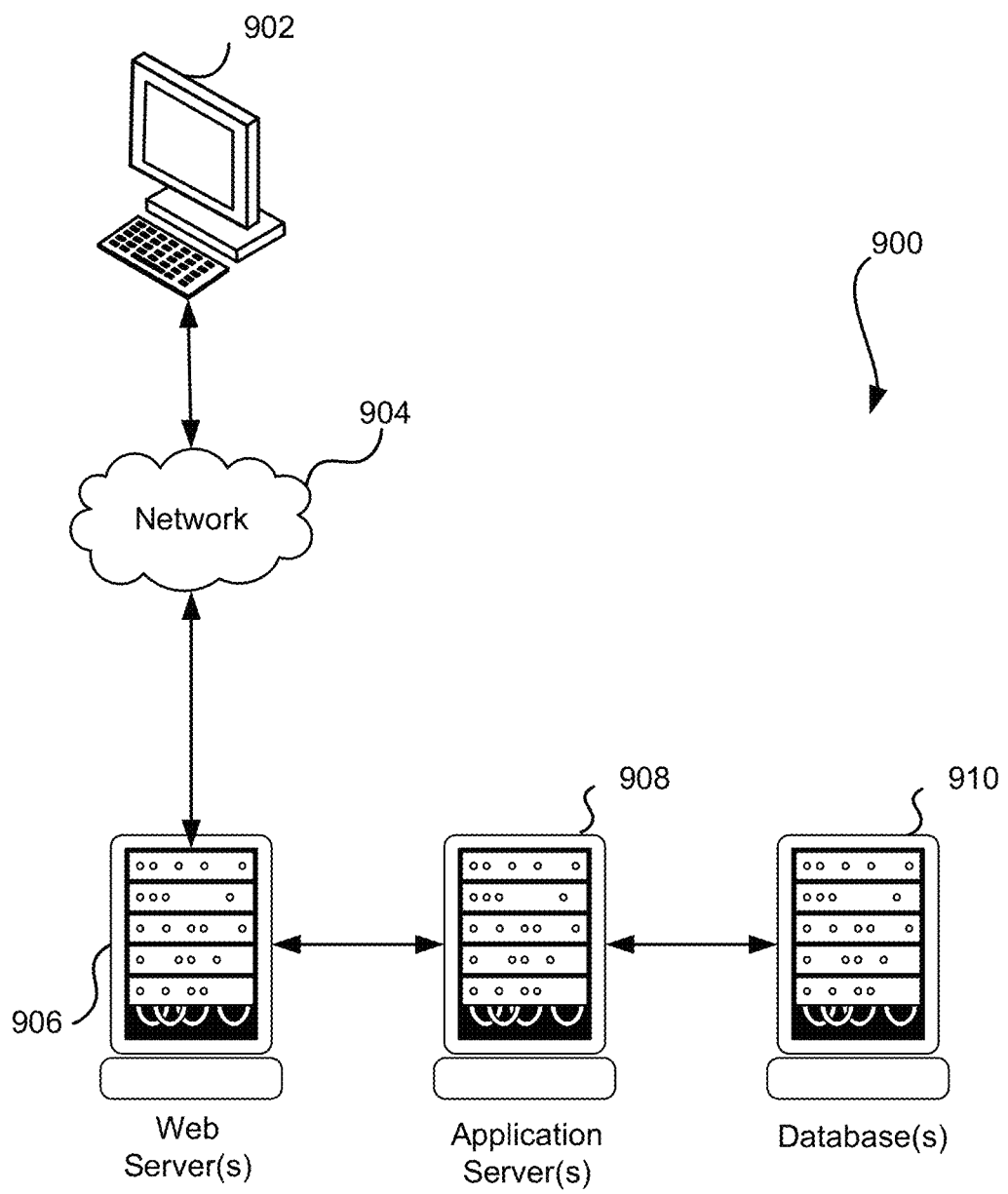
FIG. 9 illustrates an example of a system in which various embodiments can be implemented.

The configuration query service 108 may comprise one or more computing devices, such as one or more of the servers depicted in FIG. 9. The client device 102 may communicate with the configuration query service 108, via the network 104a, to query for configuration data.

A query of configuration data may refer, in at least one embodiment, to a configuration property and to a period of time. The configuration property refers to an aspect of the configuration about which information is desired, and the period of time limits the scope of the query to the indicated time. A period of time may sometimes referred to as a timeframe, timespan, or time. Examples of queries for configuration data include, but are not limited to, the following:

"provide a history of configuration changes to 'system A' from Nov. 2, 2019 to Nov. 4, 2019"

"retrieve a snapshot of the configuration of 'system B' as of Nov. 12, 2019"

"retrieve configuration documents applicable to my hosted services, as of Sep. 23, 2019"

"provide all values of the registry setting 'X' from Jun. 1, 2019 to Jun. 20, 2019"

"provide a history of disk space available on drive C: from 10:00 am to 10:30 am on Jun. 5, 2019"

"was the application XYZ installed on the system as of Jan. 24, 2019?"

It will be appreciated that the above examples are intended to be illustrative rather than limiting, and that as such, the examples should not be construed in a manner which would limit the scope of the present disclosure to only those embodiments which conform to the specific examples provided.

In at least one embodiment, queries are provided in a query language, such as structured query language ("SQL") or JSON query language ("JAQL"). It will be appreciated that these examples are also intended to be illustrative rather than limiting, and that as such, the examples should not be construed in a manner which would limit the scope of the present disclosure to only those embodiments which conform to the specific examples provided.

In at least one embodiment, at least some changes to the configuration of the managed system 106 are made by a control plane 114. The control plane 114 may be any suitable computing device, or combination of computing devices, such as one or more of the servers depicted in FIG. 9.

Information indicative of configuration changes to the managed system 106 may be provided to, or obtained by, a configuration indexing service 110. The configuration indexing service 110 may be any suitable computing device, or combination of computing devices, such as one or more of the servers depicted in FIG. 9. Sources of the configuration information may include, but are not necessarily limited to, the managed system 106 and the control plane 114.

In at least one embodiment, the configuration indexing service 110 generates indexes of the configuration information obtained from the managed system 106 or control plane 114. Embodiments of these indexes are described herein, for example with respect to FIG. 3.

In at least one embodiment, the indexes generated by the configuration indexing service 110 are provided to and stored by a remote storage service 112. The configuration indexing service 110, in at least one embodiment, sends the indexes to the storage service 112 via a network 104b. The network 104b may be similar to the network 104a, or may comprise any number of alternative or additional networking technologies. Alternatively, in at least some embodiments, the network 104b used to access the storage service 112 is not distinct from the network (not pictured) used to connect other services operated by the provider, such as the configuration query service 108 and configuration indexing service 110.

The storage service 112, in at least one embodiment, is a service for providing storage capability that scales independently of the other depicted services. Thus, the storage service 112 may scale independently of the configuration query service 108 and the configuration indexing service 110. The storage service 112 may also provide storage capabilities that are relatively inexpensive, compared for example to the storage capabilities of some conventional database management systems. This advantage may be a consequence of the storage service 112 using file-based storage structures or various other optimizations not used by conventional database management systems.

The configuration query service 108, in at least one embodiment, processes a query of configuration data by downloading and processing certain of the indexes generated by the configuration indexing service 110. As described in more detail herein, for example with respect to FIGS. 6-8, this processing, in at least one embodiment, comprises identifying a time-based index and downloading the time-based index from the storage service, identifying a content index using the time-based index, downloading the content index from the storage service, and searching the content index for references to the queried configuration data. A result of the query may then be generated based on the results of the search.

Figure 2:
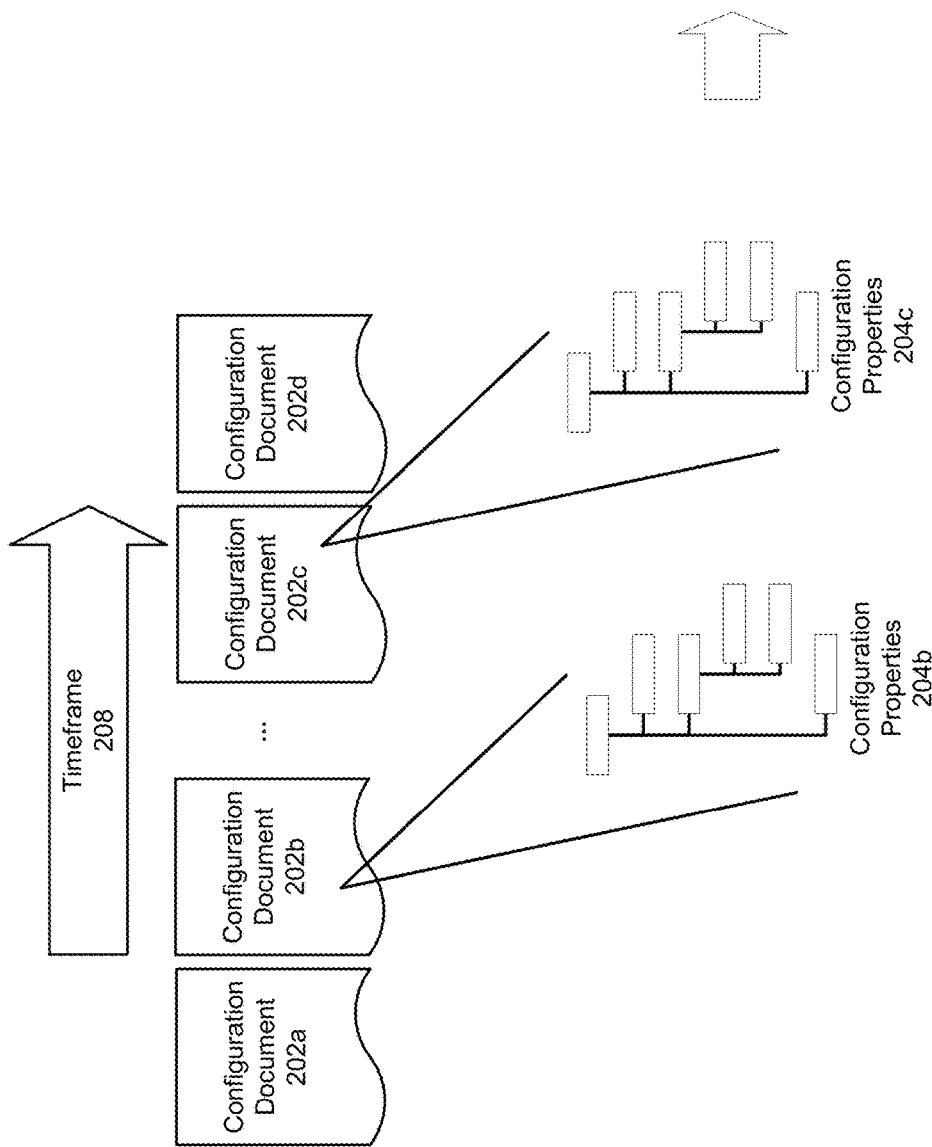
FIG. 2 illustrates an example of changes to configuration data over time, in accordance with at least one embodiment.

FIG. 2 illustrates an example of changes to configuration data over time, in accordance with at least one embodiment. In the example 200 of FIG. 2, a series of configuration documents 202a-d is generated over time. For the purposes of the example 200, a subset 202b-c are applicable to a timeframe 208. For example, the earliest configuration document 202a may be presumed, for the purpose of the example, to be relevant to a time prior to the timeframe 208. Likewise, a subsequent configuration document 202d might be presumed to be relevant to a time subsequent to the timeframe 208.

Note that each configuration document, for the purpose of the example of FIG. 2, is assumed to supersede any of the configuration documents that came before it. In other words, each configuration document is assumed, for the example of FIG. 2, to be a complete view of the configuration of the managed system. However, in various embodiments, a configuration document might represent only a subset of applicable configuration properties. As such, a subsequent configuration document might not supersede one or more of the properties described by a prior configuration document. This may occur, for example, when a subsequent configuration document pertains to a different aspect of a system's configuration than a prior configuration document. Also note that various other structures, other than documents, may contain property representations that may be treated similarly to configuration documents. A configuration document, as used herein, includes file and memory-based structures in which a collection of properties and their corresponding values are stored.

The configuration documents 202a-d may represent various aspects of configuration data. For example, in at least one embodiment, configuration data from a managed system, such as the managed system 106 depicted in FIG. 1, are represented in a document or other data file. In at least one embodiment, the file is in a JavaScript Object Notation ("JSON") format, or another similar format such as extended markup language ("XML"). As depicted in FIG. 2, a configuration document, such as the depicted configuration documents 202b-c, may comprise a hierarchy of configuration properties 204b-c, although various other structures are possible and contemplated. The configuration properties 204b-c may, more generally, comprise a collection of name-value pairs in which each pair describes a configuration property and a corresponding value. These name-value pairs may, in some cases, be nested to form the depicted hierarchies of configuration properties 204b-c.

The configuration properties 204b-c for the timeframe 208 are indexed, in at least one embodiment, in the content index 206. The content index 206 is generated, in at least one embodiment, by a configuration indexing service, such as the configuration indexing service 110 depicted in FIG. 1. The content index 206, once generated, may contain copies or references to the configuration properties 204b-c that correspond to the timeframe 208. The configuration properties of configuration documents 202a,d not included in the timeframe 208 are excluded from the depicted content index 206, though may be indexed in a content index applicable to a prior or subsequent time period.

In at least one embodiment, the content index 206 comprises records indicative of the value of a property as it was during the applicable timeframe 208. In the content index, a record may comprise information describing a configuration property or a configuration document, and may also contain a reference to the original property or document. A content index record, in at least one embodiment, comprises the name of the property, the corresponding value, and a time indicator. A search of the data contained in the content index may, for example, be used to generate a history of a property within the applicable timeframe, or to provide an indication of what the property was set to as of an indicated time. A content index may, in at least one embodiment, contain information describing a linear series of configuration updates that occurred within a given time period. In other cases and embodiments, a content index may contain information describing updates to a single resource, such as changes to a particular disk drive or compute node. In other cases and embodiments, a content index may contain all configuration data applicable to a given time period, whether or not updates to the configuration data occurred.

In at least one embodiment, a configuration indexing service periodically generates new content indexes and causes the content indexes to be stored by a storage service. Because such data may change frequently and may be inherently voluminous, a large number of such indexes may be generated. The use of a storage service, and other aspects of embodiments described herein, may provide efficiency over other techniques for indexing data. This may be due, in part, to the efficiency and independent scalability of the storage service, and the indexing techniques described herein.

Figure 3:
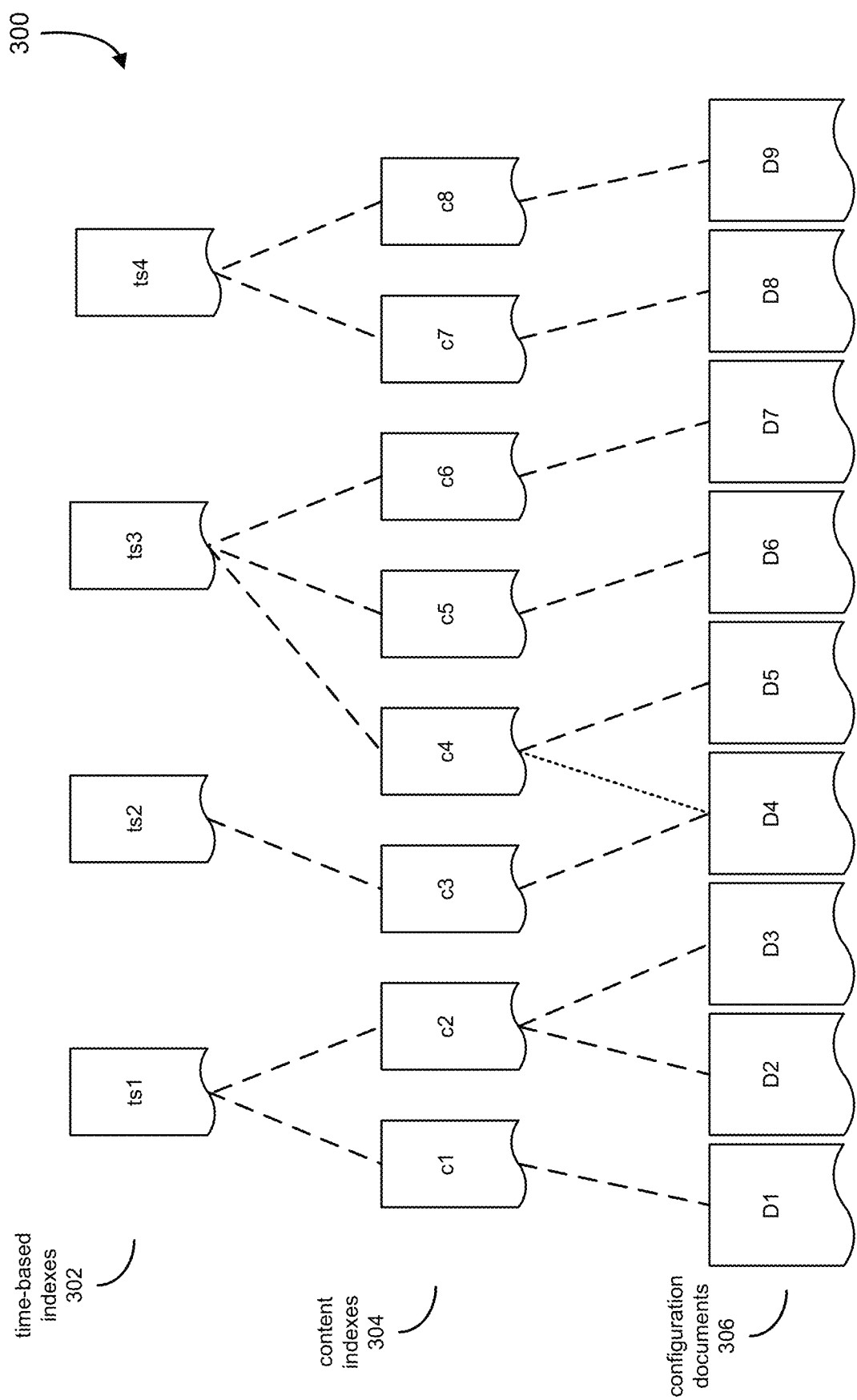
FIG. 3 illustrates an example of indexing changes to configuration data over time, in accordance with at least one embodiment.

FIG. 3 illustrates an example of indexing changes to configuration data over time, in accordance with at least one embodiment. The example 300 of FIG. 3 depicts a multi-level index structure in which a top-level of time-based indexes 302 is used with a lower-level of content indexes 304. The content indexes 304, in turn, provide references to configuration documents 306 applicable to a corresponding time period.

Each of the time-based indexes 302 is applicable to one of a set of time periods $ts_1$-$ts_4$. Here, the applicability of a time period refers to the content indexes 304 that are linked to a given time-based index. For example, the time-based index for the time period $ts_1$ might be linked to two content indexes $c_1$ and $c_2$. Each content index might be linked to one or more configuration documents. For example, the content index c1 might index the contents of the document D1, and the content index $c_2$ might index the contents of the documents $D_2$ and $D_3$. In some embodiments, configuration document, such as $D_4$, will be referenced by at most one content index, such as $c_3$.

Note that FIG. 3 depicts a number of time-based indexes 302. The number of such indexes may be determined by a variety of factors, such as the size of files containing the index, the expected growth of such files, the expected range of dates and times that might be searched, and so on. In at least one embodiment, the number of time-based indexes 302 is determined so that an efficiency goal is met with respect to downloading and searching a time-based index. In at least one embodiment, a single time-based index is used, rather than multiple time-based indexes.

Likewise, the number of content indexes 304 may be determined based on similar factors, including the size of files containing the content indexes. The number of content indexes 304 may likewise be based on meeting an efficiency goal with respect to downloading and searching a content index.

In at least one embodiment, a content index comprises data referencing elements in a configuration document, where each configuration element referenced in the content index is applicable to a corresponding time frame.

In at least one embodiment, a content index comprises data referencing elements in a plurality of configuration documents, where each configuration document is applicable to a corresponding time frame.

In at least one embodiment, a content index comprises a plurality of records, each record comprising the name of a configuration property, a value of the corresponding configuration property, and a time period during which the configuration property was set to the value.

A configuration document may represent a whole or partial view of the configuration of a managed system, such as the managed system depicted in FIG. 1. A particular configuration document, such as any one of the configuration documents 306 depicted in FIG. 3, may be applicable to the managed system for some period of time, including periods of time which span more than one of the time-based indexes. For example, the depicted configuration document D4 is indexed by both $C_3$ and $C_4$, and is applicable to the time periods covered by the time-based indexes $ts_2$ and $ts_3$. Note that this situation would not occur if each of the configuration documents 306 were a complete set. If this were the case, each configuration document would superseded all of the configuration properties of the configuration document that came before it. Otherwise, if a given configuration document only represents part of the configuration of the managed system, it may contain properties not superseded by a subsequent configuration document.

The indexing structure depicted in FIG. 3 may be used, in at least one embodiment, to locate configuration properties relevant to a particular time period. For example, consider the case where a query, upon execution, is to return the value of a configuration property $P_1$ as of a time $t_1$. Further consider that, in this example, $ts_3$ spans from $t_n$ to $t_{n+1}$, and $t_n < t_1 < t_{n+1}$. In other words, $t_1$ falls within the timespan $ts_3$. The time-based index ts3 can be queried to find which of the content indexes $c_4$-$c_6$ are applicable to the time $t_1$. This might be a subset of the content indexes $c_4$-$c_6$. For example, the time-based index ts3 might be used to identify $c_5$ and $c_6$ as being relevant to the time $t_1$, but not the content index $c_4$. The content indexes c5 and c6 might then be searched to identify entries indicating the value of the property $P_1$ as of the time $t_1$.

The indexing structure depicted in FIG. 3 may also be used, in at least one embodiment, to generate a snapshot of configuration settings as of a particular time. For example, a client might request, for a computing environment managed on the client's behalf, a snapshot of all configuration data relevant to that environment, as of a time $t_1$ indicated by the request. A time-based index relevant to $t_1$ might then be located, and used to identify relevant configuration information, such as a relevant configuration document.

The indexing structure depicted in FIG. 3 might also be supplemented, in at least one embodiment, by additional indexing, or other techniques, for locating data relevant to a particular account, system, or entity. For example, an additional index might be used to index the time-based indexes 302 based on a client account or managed system. This might be done, for example, to facilitate the identification of configuration changes made to a particular system, to a group of systems, or to all systems associated with a client.

Figure 4:
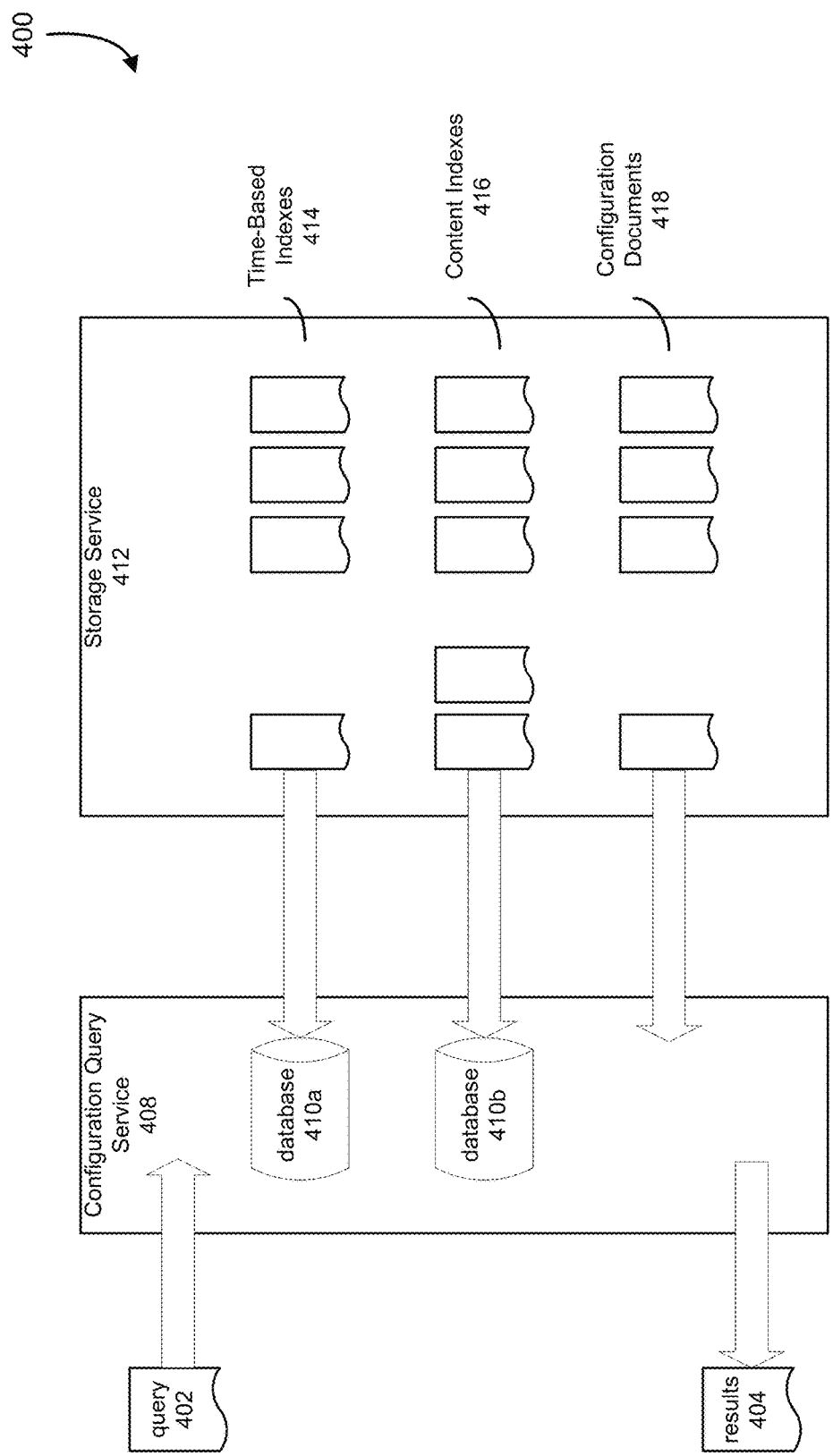
FIG. 4 illustrates an example of retrieving a history of changes to configuration data, in accordance with at least one embodiment.

These techniques may be further understood in view of FIG. 4, which illustrates an example of retrieving a history of changes to configuration data, in accordance with at least one embodiment. In the example 400 of FIG. 4, a configuration query service 408 processes a query 402, in order to return results 404 to a client device.

In at least one embodiment, the query 402 is a textual representation of a request to retrieve information about a property value during a time period indicated by the query 402. Examples of such textual representations include, but are not necessarily limited to, query languages such as SQL.

The configuration query service 408, in at least one embodiment, parses the query 402 and identifies both the property value that is to be queried and the time period for the query. For example, the configuration query service 408 might parse the query 402 and determine that it comprises a request to return the value of the property $P_1$ over the timer period $t_1$ to $t_2$.

The configuration query service 408, in at least one embodiment, then identifies one or more time-based indexes that may contain data relevant to the time period $t_1$ to $t_2$. As described herein, for example with respect to FIG. 3, each of the time-based indexes 414 corresponds to an interval of time. The time-based indexes 414, in at least one embodiment, are identified in the storage service according to a naming pattern that incorporates the interval. For example, a time-based index covering the 24-hour period of Nov. 2, 2019 might be named "ts_index_2019_11_02." It will be appreciated that this example is intended to be illustrative, and as such should not be construed in a manner which would limit the scope of the present disclosure to only those embodiments that conform to the specific example provided.

Accordingly, in at least one embodiment, the configuration query service 408 identifies relevant time-based indexes based on the naming pattern and the time interval indicated by the query. For example, if the query indicated interest in the time period from 11:00 am to 12:00 pm on Nov. 2, 2019, the configuration query service 408 could, based on knowledge of the query pattern, generate the name "ts_index_2019_11_02" and request that a time-based index with that name be returned from the storage service 412.

In at least one embodiment, the configuration query service 408 loads the retrieved time-based index into a database 410a. A database, as used herein, refers to a structured collection of data and software and/or hardware components for storing and retrieving the data. An aspect of a database, sometimes referred to as a query engine, refers to software and/or hardware configured to search the structured collection of data.

In at least one embodiment, the configuration query service 408 loads the retrieved time-based index into the database 410a by causing it to be added to the structured collection of data maintained by the database. For example, the configuration query service 408 may create a temporary table in the database 410a in which columns of data from the time-based index are transferred to corresponding columns of data in the database's structured collection of data.

In at least one embodiment, data from the retrieved time-based index is loaded into the database 410a using a bulk-loading or bulk-insert operation.

A row of the table created in the database 410a may comprise the name of one of the content indexes 416, the location of the particular content index, and data indicating the time period to which the content index is applicable. This table may therefore be searched to retrieve a list of content indexes applicable to the time period $t_1$ to $t_2$ (recalling that, for this example, the configuration query service 408 is processing a query that comprises a request to return the value of the property $P_1$ over the timer period $t_1$ to $t_2$).

The content indexes may then be retrieved, in at least one embodiment, and loaded into a database 410b. This may be the same database 410a that was used to load the time-based index, or a different database. In order to retrieve the content indexes, the configuration query service 408 may use the location data obtained from the database's 410a search of the retrieved time-based index. The content indexes retrieved during this step are those relevant during the time period $t_1$ to $t_2$.

In at least one embodiment, the configuration query service 408 loads the content indexes into a table whose rows comprise a property name, a value for the property, and a time during which the value applied to the property. The table, in at least one embodiment, also comprises a reference to a configuration document.

In at least one embodiment, the configuration query service 408 loads the content indexes into a table whose rows comprise a property name and a value for the property, but not a relevant time period, under the assumption that the applicable time period is defined by the time-based index, or time-based indexes, that are the parent(s) of the particular content index. Thus, in this case, if the time-based index covers the time period from $t_1$ to $t_2$, the content indexes referred to by the time-based index are also defined to be applicable to the time period from $t_1$ to $t_2$.

In at least one embodiment, the table loaded into database 410b does not contain the value of the property. It may contain, instead, a reference to a corresponding configuration document 418 that contains the property and its corresponding value. The reference is usable by the configuration query service 408 to load the corresponding configuration file.

In at least one embodiment, the table loaded into the database 410b contains both the value of the property and a reference to a corresponding configuration document.

The table containing data from the retrieved content index, or content indexes, can be searched by the query engine of the database 410b. This allows the identification of a property and its corresponding value for the time indicated by the query. If the property has changed within the applicable time period, e.g., between t1 and t2, then a number of values for the property might be identified.

In at least one embodiment, the configuration query service 408 retrieves the corresponding configuration documents in order to obtain the value of the property. Alternatively, the value may be included in the retrieved content index and loaded into the database's 410b table.

The configuration query service 408, in at least one embodiment, then generates results 404 of the query 402 using the obtained value(s) of the queried property. The generation of the results may comprise, for example, creating a representation, in the memory of a computing device on which the configuration query service 408 runs, a table or list comprising the queried value or values. For example, the configuration query service 408 might generate a table comprising a list of values for the property $P_1$ and a corresponding time during which the property was set to a value.

In at least one embodiment, the results 404 of the query 402 comprises a list of property values and the corresponding time periods during which a particular value was in effect on the system in question.

In at least one embodiment, the results 404 of the query 402 comprises one or more configuration documents applicable to a time period indicated by the query.

In at least one embodiment, the results 404 of the query 402 comprises an answer to a question, such as the question "was property $P_1$ set to value $V_1$ at time $t_1$?"

It will be appreciated that the aforementioned examples of results 404 are intended to be illustrative rather than limiting, and as such should not be construed in a manner which would limit the scope of the present disclosure to only those embodiments conforming to the specific examples provided.

Figure 5:
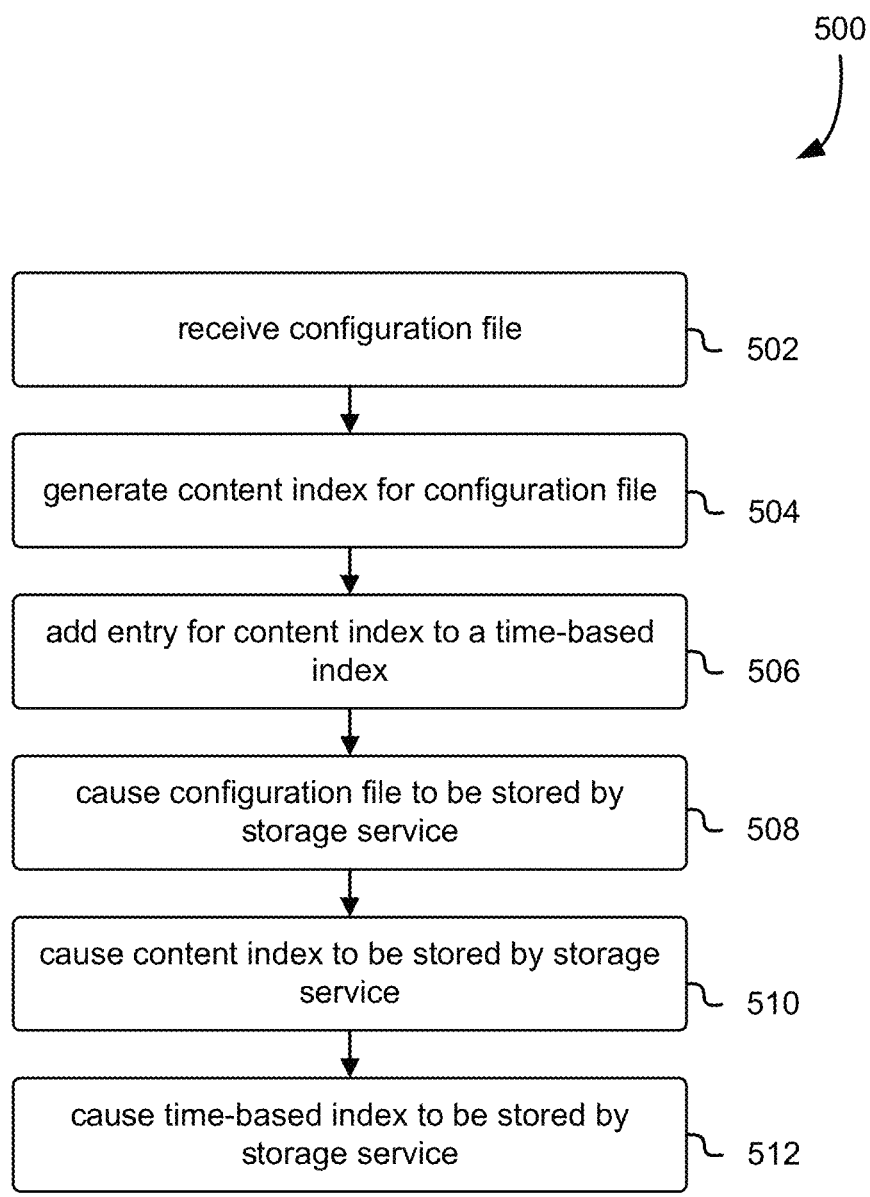
FIG. 5 illustrates an example process of generating and storing indexes of configuration data, in accordance with at least one embodiment.

FIG. 5 illustrates an example process of generating and storing indexes of configuration data, in accordance with at least one embodiment. The example process 500 may be performed by any suitable computing system or combination of systems, including for example the servers depicted in FIG. 9. For example, one or more of the web servers 906 and application servers 908 might implement a configuration query service, such as the configuration query service 108 depicted in FIG. 1, and one or more of the application servers 908 might implemented a configuration indexing service, such as the configuration indexing service 110 that is depicted in FIG. 1.

Although FIG. 5 is depicted as a series of steps or operations, the depicted sequence should not be viewed as limiting the scope of the present disclosure to only those embodiments that conform to the depicted sequence. For example, in various embodiments, the steps or operations depicted in FIG. 5 may be altered, reordered, or omitted, except where explicitly stated or where logically required, as might be the case when the input to one step or operation is dependent upon the output of another step or operation.

At 502, in at least one embodiment, a configuration indexing service receives a configuration file. The configuration file contains data indicating the values of one or more configuration file during an indicated time period. For example, the configuration indexing service might monitor data associated with the configuration of a computing system by receiving updated configuration information, in the form of a configuration file, when the configuration of the computing system has changed. The configuration data contained in the configuration file may be viewed as applicable to, or associated with, a time period that begins when the configuration file is received, or at some other indicated time. The time period may end when the data in question is superseded by another configuration file.

In various embodiments, other formats are used, in place of configuration files, to transmit configuration data. For example, rather than being stored in a file, configuration data might be sent as packets of data. A variety of other formats and techniques might be employed, and may generally be used as substitutes for files. For simplicity in description, the term configuration file is used herein.

At 504, in at least one embodiment, the configuration indexing service generates a content index for the configuration file. The content index may represent some or all of the configuration data applicable to a given time period. For example, the configuration indexing service might generate one content index every ten minutes, or some other interval, based on whatever configuration information is current as of the beginning, middle, or end of that time period.

In at least one embodiment, the configuration indexing service generates content index files such that the files are less than a defined threshold amount. This maximum size may be determined, for example, based on efficiency considerations, such as with respect to the downloading of the file and the loading of some or all of the file into a local database. In at least one embodiment, when a content index applicable to a given time period might otherwise exceed a maximum size, the configuration indexing service begins to generate a new content index, rather than continuing to write data to the old index.

In at least one embodiment, the content file comprises records searchable by a key that contains the name of a configuration property. The key can be used to lookup a corresponding value for the configuration property. The key, in at least one embodiment, is a compound key which also comprises time period information. The key may therefore be used to identify, within a configuration file, the value of a configuration property as of an indicated time, or to retrieve a history of the value of the configuration property over time.

At 506, in at least one embodiment, the configuration indexing service adds an entry for the content index to a time-based index. The entry comprises a record which associates the content index with its associated time period. In this way, the time-based index can be used to search for content indexes that are applicable to a given time period.

At 508, in at least one embodiment, the configuration indexing service causes the configuration file to be stored by a storage service. This operation, if performed by an embodiment, leverages the scalable storage aspects of the storage service to provide a historical archive of a computing system's configuration.

At 510, in at least one embodiment, the configuration indexing service causes the content index to be stored by the storage service. Likewise, at 512, in at least one embodiment, the configuration indexing service causes the time-based index to be stored by the storage service.

In at least one embodiment, the storage service is capable of scaling independently of other services. For example, the storage capacity of the storage service might scale upwards independently of the processing or storage capacity of the configuration query service.

Figure 6:
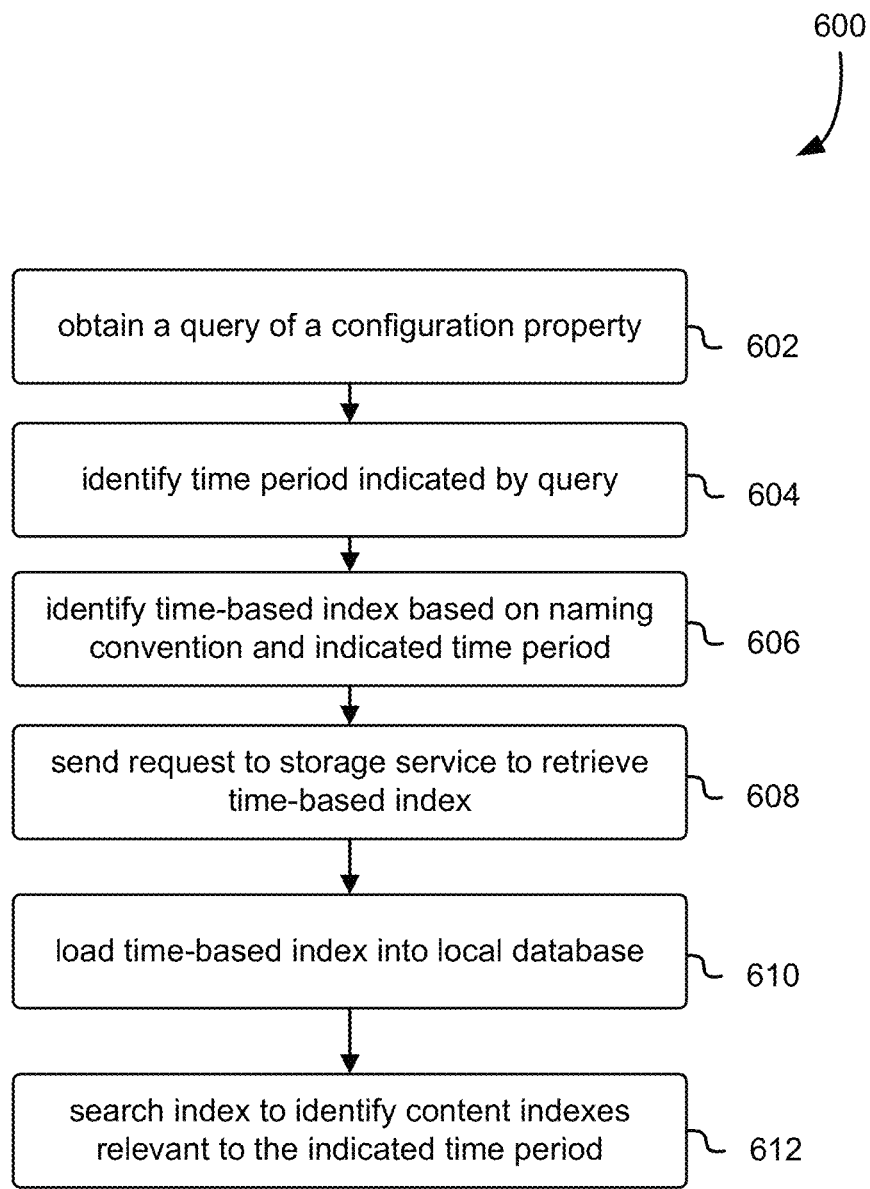
FIG. 6 illustrates an example process of using time-based indexes to locate a content index, in accordance with at least one embodiment.

FIG. 6 illustrates an example process of using time-based indexes to locate a content index, in accordance with at least one embodiment. The example process 600 may be performed by any suitable computing system or combination of systems, including for example the servers depicted in FIG. 9. For example, one or more of the web servers 906 and application servers 908 might implement a configuration query service, such as the configuration query service 108 depicted in FIG. 1, and one or more of the application servers 908 might implemented a configuration indexing service, such as the configuration indexing service 110 depicted in FIG. 1.

Although FIG. 6 is depicted as a series of steps or operations, the depicted sequence should not be viewed as limiting the scope of the present disclosure to only those embodiments that conform to the depicted sequence. For example, in various embodiments, the steps or operations depicted in FIG. 6 may be altered, reordered, or omitted, except where explicitly stated or where logically required, as might be the case when the input to one step or operation is dependent upon the output of another step or operation.

At 602, in at least one embodiment, a configuration query service obtains a query of a configuration property. This may refer, in at least one embodiment, to a query language command indicating one or more configuration properties that are of interest. The query may further indicate an associated time period. For example, the query might indicate that the values of the configuration property $P_1$, for a time period beginning at $t_1$ and ending at $t_2$, should be retrieved. The configuration query service might then return a time series of all values of $P_1$ that were applicable between $t_1$ and $t_2$.

At 604, in at least one embodiment, the configuration query service identifies the time period indicated by a query. As just noted, the query may specify an applicable time range, such as between $t_1$ and $t_2$. The query might indicate only a particular time, which can be also be treated as a time span.

At 606, in at least one embodiment, the configuration query service identifies a time-based index, based on a naming convention and the indicated time period. Various properties of the query can be used, in combination with a naming pattern for the time-based indexes, to identify a time-based index that is relevant to the indicated time period. For example, a time-based index can be stored, on the storage service, according to a naming convention that identifies the time period to which the time-based index is relevant. Other factors that may be used to identify the time-based index may include the system to which the configuration data is applicable, an account associated with the system, a user of the system, and so on. It will be appreciated that these examples are intended to be illustrative, and as such the examples should not be construed in a manner which would limit the scope of the present disclosure to only those embodiments which include the specific examples provided.

At 608, in at least one embodiment, the configuration query service sends a request to a storage service to retrieve the time-based index. This can be done using the name of the time-based index identified at element 606.

At 610, in at least one embodiment, the configuration query service loads the time-based index into a local database. Here, the database is described as local because it is remote to the storage service but "close" to the configuration query service, e.g. operative on the same server or local area network.

In at least one embodiment, the time-based index is loaded into the main memory of a computing system. This may comprise random access memory, or other high-speed memory. In at least one embodiment, the content index is loaded onto a storage device, such as a mechanical disk drive or solid-state drive.

In at least one embodiment, a file representing the time-based index is structured using a format compatible with a database management system. For example, the time-based index might be stored in a file whose structure mirrors that of a table or index file structure used by the database. This techniques may facilitate efficient loading of the index into a local database.

At 612, in at least one embodiment, the configuration query service searches the time-based index to identify content indexes that are relevant to the indicated time period. The search may be done, in at least one embodiment, by a database query engine which locates relevant index records in the memory or on the storage device.

Figure 7:
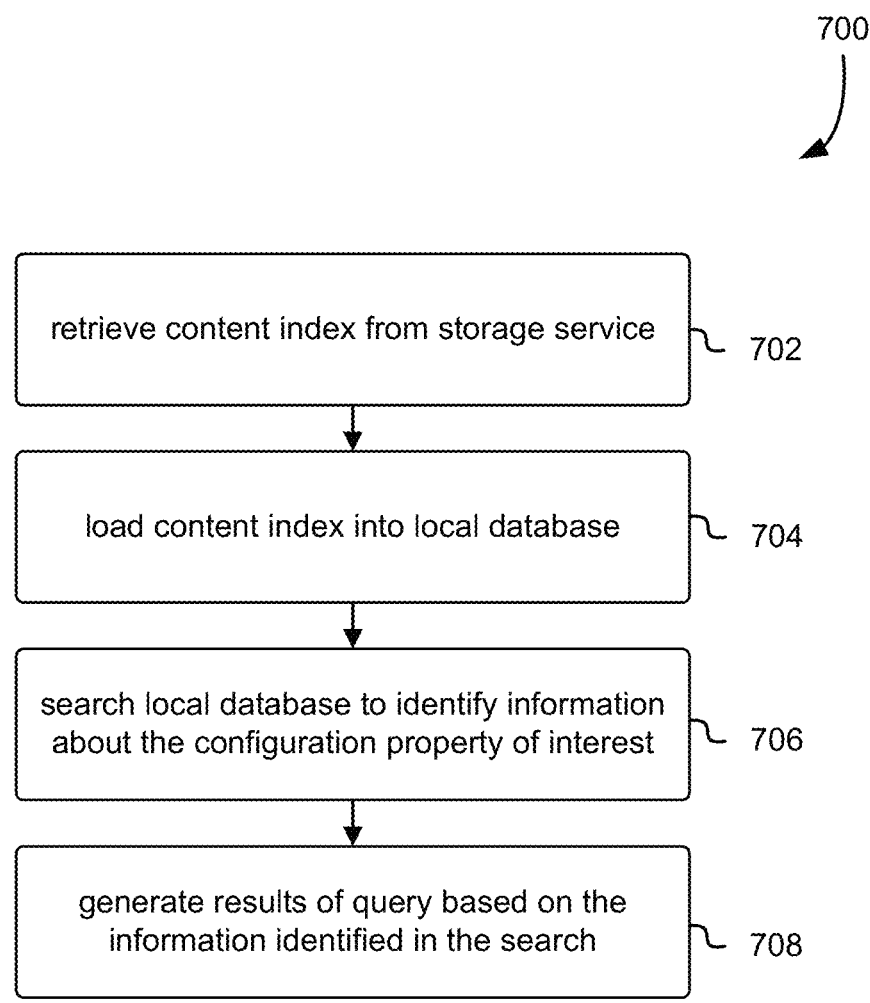
FIG. 7 illustrates an example process of responding to a query of configuration data using a content index, in accordance with at least one embodiment.

FIG. 7 illustrates an example process of responding to a query of configuration data using a content index, in accordance with at least one embodiment. The example process 700 may be performed by any suitable computing system or combination of systems, including for example the servers depicted in FIG. 9. For example, one or more of the web servers 906 and application servers 908 might implement a configuration query service, such as the configuration query service 108 depicted in FIG. 1, and one or more of the application servers 908 might implemented a configuration indexing service, such as the configuration indexing service 110 depicted in FIG. 1.

Although FIG. 7 is depicted as a series of steps or operations, the depicted sequence should not be viewed as limiting the scope of the present disclosure to only those embodiments that conform to the depicted sequence. For example, in various embodiments, the steps or operations depicted in FIG. 7 may be altered, reordered, or omitted, except where explicitly stated or where logically required, as might be the case when the input to one step or operation is dependent upon the output of another step or operation.

At 702, in at least one embodiment, the configuration query service retrieves a content index from the storage service. The configuration query service, having searched the time-based index for a reference to a content-index associated with the time period, may use the reference to identify the content index to the storage service. The content index may then be downloaded.

At 704, in at least one embodiment, the configuration query service loads some or all of the content index into a local database. As with the database used to load the time-based index, the database may be described as local because it is remote to the storage service but "close" to the configuration query service, e.g. operative on the same server or local area network. This database may be the same database used to search the time-based index.

In at least one embodiment, some or all of the content index is loaded into the main memory of a computing system. This may comprise random access memory, or other high-speed memory. In at least one embodiment, the content index is loaded onto a storage device, such as a mechanical disk drive or solid-state drive.

In at least one embodiment, a file representing the content index is structured using a format compatible with a database management system. For example, the content index might be stored in a file whose structure mirrors that of a table or index file structure used by the database, which may facilitate efficient loading of the index into a local database.

In at least one embodiment, the content index is stored using a B-tree or similar structure, in order to enable efficient loading of portions of the index from a local storage device into a local database.

At 706, in at least one embodiment, the configuration query service searches the local database to identify information about the configuration property of interest. In particular, the data from the index loaded at 704 is searched. In at least one embodiment, the search is performed by a query engine of the database. The search may comprise a full or partial search, or scan, of the indexed data, in which entries relevant to the time period and property of interest are located. Here, a search or scan refers to an operation in which some or all records of the index are examined, sequentially or in parallel, to identify those records associated with the time period and property of interest. Note that in at least some embodiments, the entirety of a particular content index may be presumed relevant to the time period, based on the index being located in the search of the time-based index. As such, a search or scan might be made without needing to reference the time period. However, in at least one embodiment, the content index comprises references to sub-divisions of the time period, and these may be examined to identify the value of a configuration property as of a particular time, with greater precision than the time-based index provides.

At 708, in at least one embodiment, the configuration query service generates results of the query based on the information identified in the search of the local database. The precise format of the generated response may vary in cases and embodiments. However, in at least one case and embodiment, the generated response comprises a table of data, in which each of one or more rows include the value of a property indicated by the query, and a time during which the property was applicable to a managed system.

Figure 8:
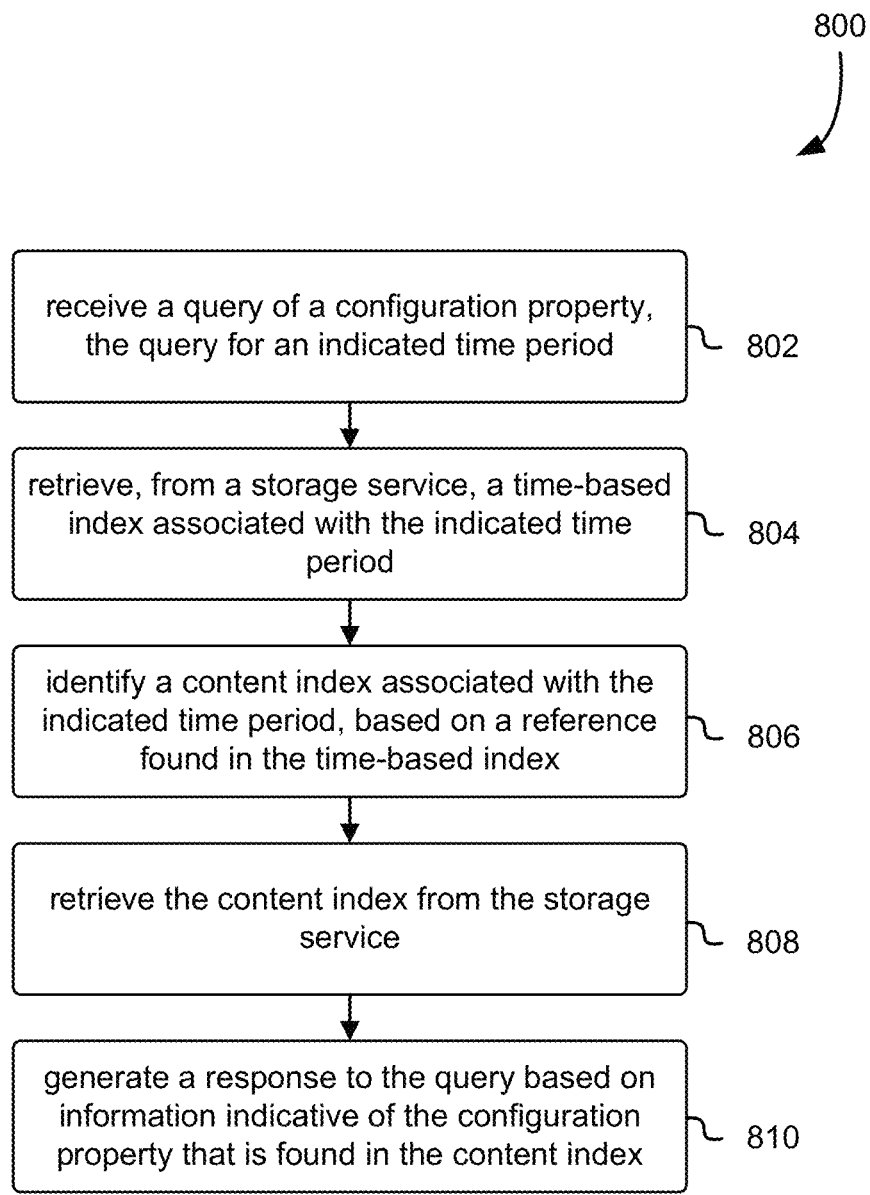
FIG. 8 illustrates an example process of receiving and generating a response to a query of configuration data, in accordance with at least one embodiment.

FIG. 8 illustrates an example process of receiving and generating a response to a query of configuration data, in accordance with at least one embodiment. The example process 800 may be performed by any suitable computing system or combination of systems, including for example the servers depicted in FIG. 9. For example, one or more of the web servers 906 and application servers 908 might implement a configuration query service, such as the configuration query service 108 depicted in FIG. 1, and one or more of the application servers 908 might implemented a configuration indexing service, such as the configuration indexing service 110 depicted in FIG. 1.

Although FIG. 8 is depicted as a series of steps or operations, the depicted sequence should not be viewed as limiting the scope of the present disclosure to only those embodiments that conform to the depicted sequence. For example, in various embodiments, the steps or operations depicted in FIG. 8 may be altered, reordered, or omitted, except where explicitly stated or where logically required, as might be the case when the input to one step or operation is dependent upon the output of another step or operation.

At 802, in at least one embodiment, the configuration query service receives a query of a configuration property, where the query is for an indicated time period. The query may, for example, include the name of the property in a "select" clause, and the time period in the "where" clause, thereby indicating that the query should be directed to the value of the property, filtered as the indicated "where" clause. It will be appreciated that this example is intended to be illustrative, and as such should not be construed in a manner which would limit the scope of the present disclosure to only those embodiments which conform to the specific example provided.

At 804, in at least one embodiment, the configuration query service retrieves, from a storage service, a time-based index associated with the indicated time period. As described herein, for example with reference to FIG. 6, retrieving the time-based index may comprise identifying a name of a file containing the index, based on the time period indicated by the query, sending a request to retrieve the file to the store service, and receiving the file from the storage service. The contents of the file may be loaded, in at least one embodiment, into a local database and searched to identify a reference to a content index relevant to the indicated time period.

At 806, in at least one embodiment, the configuration query service identifies a content index that is associated with the indicated time period, based on a reference to the content index that was found in the time-based index.

At 808, in at least one embodiment, the configuration query service retrieves the content index from the storage service. The configuration query service uses the reference to the content index, as found in the time-based index, to obtain a name of a file comprising the content index, and to generate a request to the storage service for retrieving the file. In at least one embodiment, the file is then downloaded from the storage service, loaded into a local database, and searched. The search identifies the values of a property of interest, as indicated by the query, during the relevant time period.

At 810, in at least one embodiment, the configuration query service generates a response to the query, based on information indicative of the configuration property that was found in the content index. The generated response may, for example, comprise a table in which each of one or more rows of the table include a column indicating the value of a property and a time during which the property was applicable to a managed system.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a database 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The database 910, in an embodiment, includes several separate data tables, databases, data documents, dynamic data storage schemes and/or other data storage mechanisms and media for storing data relating to a particular aspect of the present disclosure. The database 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions.

In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
at least one processor; and
a memory comprising executable instructions that, in response to execution by the at least one processor, cause the system to at least:
receive a query indicative of a request to identify a value of a configuration property during a time period indicated by the query;
retrieve a first index from a remote storage service, the first index determined to comprise data corresponding to the time period, the first index indexed by time and comprising a reference to a second index, the second index comprising information mapping to a value of the configuration property applicable to the time period;
retrieve the second index from the remote storage service based, at least in part, on the reference; and
provide a result of the query based at least in part on locating, in the second index, information indicative of the configuration property.

2. The system of claim 1, wherein the first index comprises a record associating the reference to the second index with the time period.

3. The system of claim 1, wherein the executable instructions, in response to execution by the at least one processor, cause the system to at least:
monitor data indicative of a configuration of a computing system; and
generate the first index and the second index based at least in part on the data indicative of the configuration.

4. The system of claim 1, wherein the executable instructions, in response to execution by the at least one processor, cause the system to at least:
load the first index into a database;
search the first index, using a database engine of the database, based at least in part on the time period; and
identify the second index based at least in part on a result of the search of the first index.

5. The system of claim 1, wherein the executable instructions, in response to execution by the at least one processor, cause the system to at least:
load data of the second index into a database; and
identify, using the database and the data of the second index, a value of the configuration property during the time period based at least in part on a key comprising a name of the configuration property.

6. A computer-implemented method, comprising:
receiving a request to identify a value of a property applicable to a time period;
retrieving, based at least in part on the time period, a first index from a remote storage service, the first index indexed by time and comprising a reference to a second index comprising information mapping to a value of the property;
retrieving the second index from the remote storage service, the index identified on the remote storage service based, at least in part, on the reference; and
generating a response to the request, based at least in part on locating, in the second index, information indicative of the value of the property applicable to the time period.

7. The computer-implemented method of claim 6, further comprising:
determining that the second index is applicable to the time period based at least in part on a record, in the first index, that is indicative of an association between the second index and the time period.

8. The computer-implemented method of claim 6, wherein the first index comprises references to a plurality of indexes associated with time periods within a defined interval of time.

9. The computer-implemented method of claim 6, further comprising:
generating, by an indexing service, the first index and the second index based at least in part on data indicative of changes to the property over time; and
providing the first index and the second index to the storage service for storage.

10. The computer-implemented method of claim 9, wherein the storage service is independently scalable with respect to the indexing service.

11. The method of claim 6, further comprising:
identifying the second index based at least in part on a scan of the first index by a database engine.

12. The method of claim 6, further comprising:
obtaining a value of the property during the time period based at least in part on a search of the second index, the search based at least in part on a key comprising a name of the property.

13. The method of claim 6, wherein the second index comprises a reference to a document comprising an indication of a value of the property.

14. A non-transitory computer-readable storage medium having stored thereon executable instructions that, in response to being executed by one or more processors of a computing device, cause the computing device to at least:
obtain a query of a configuration property during a time period;
retrieve a first index associated with the time period from a remote storage service, the first index indexed by time, the first index comprising a reference to a second index comprising information indicative of the configuration property;
retrieve the second index from the remote storage service using the reference; and
generate a response to the query, based at least in part on locating, in the second index, information indicative of the configuration property.

15. The non-transitory computer-readable storage medium of claim 14, wherein the first index comprises references to a plurality of content indexes, the plurality of content indexes generated within a defined interval of time.

16. The non-transitory computer-readable storage medium of claim 14, having stored thereon further executable instructions that, in response to being executed by one or more processors, cause the computing device to at least:
generate the first index and the second index based at least in part on data indicative of a configuration of a computing system; and
cause the first index and the second index to be stored on the storage service.

17. The non-transitory computer-readable storage medium of claim 14, having stored thereon further executable instructions that, in response to being executed by one or more processors, cause the computing device to at least:
receive a configuration file comprising a plurality of name-value pairs, wherein a name-value pair of the plurality of name-value pairs corresponds to a name and value of a configuration property.

18. The non-transitory computer-readable storage medium of claim 14, having stored thereon further executable instructions that, in response to being executed by one or more processors, cause the computing device to at least:
- load the first index into memory; and
- search the first index using a database engine.

19. The non-transitory computer-readable storage medium of claim 14, having stored thereon further executable instructions that, in response to being executed by one or more processors, cause the computing device to at least:
- identify the first index based at least in part on a naming convention and the time period.

20. The non-transitory computer-readable storage medium of claim 14, wherein the response to the query comprises a history of a value of the configuration property over time.

* * * * *